No. 757,284. PATENTED APR. 12, 1904.
A. J. DOSS.
LOADING MACHINE.
APPLICATION FILED SEPT. 4, 1903.
NO MODEL. 10 SHEETS—SHEET 2.
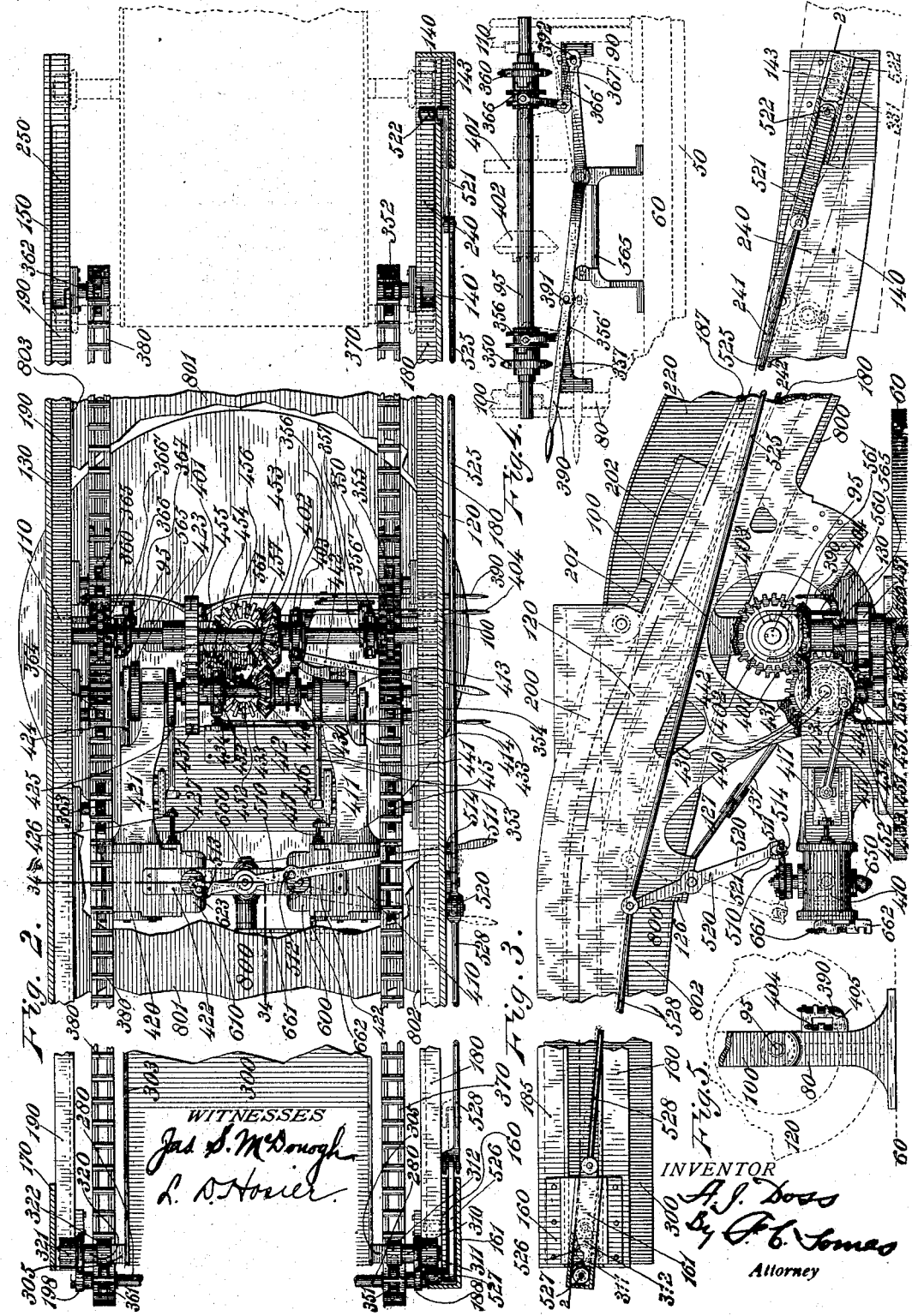
WITNESSES
Jas. S. McDonough
L. D. Hosier
INVENTOR
A. J. Doss
by J. C. Jones
Attorney

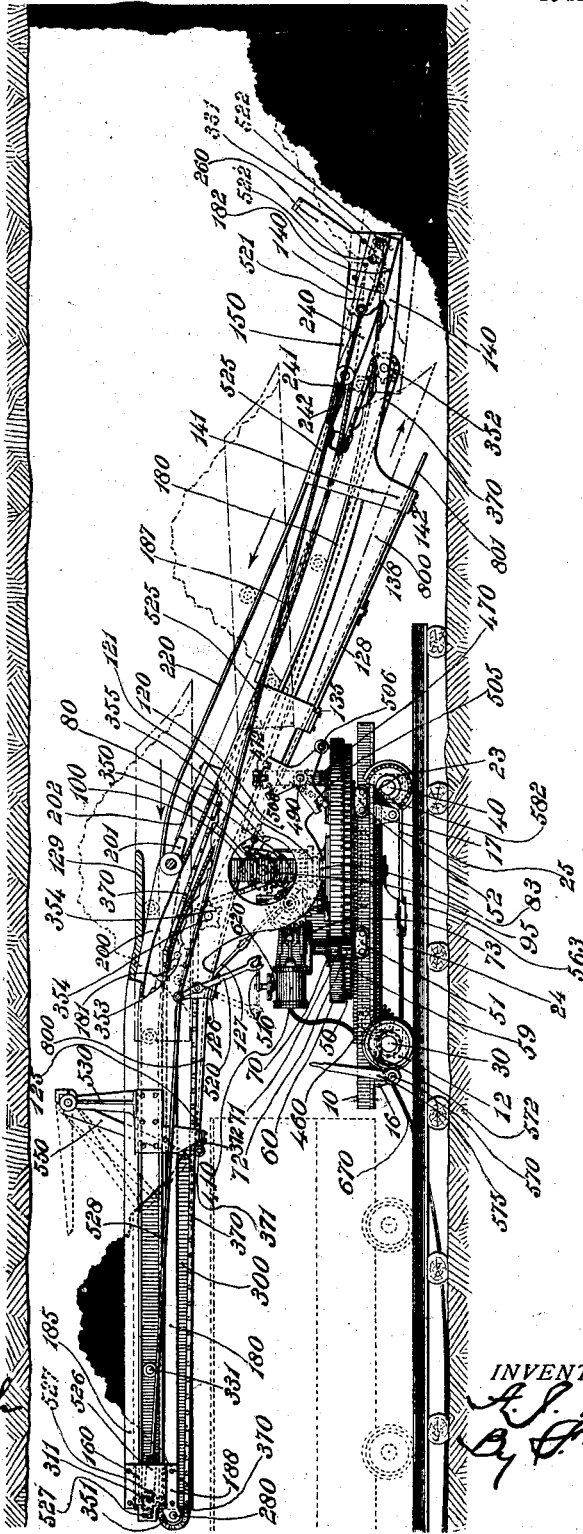

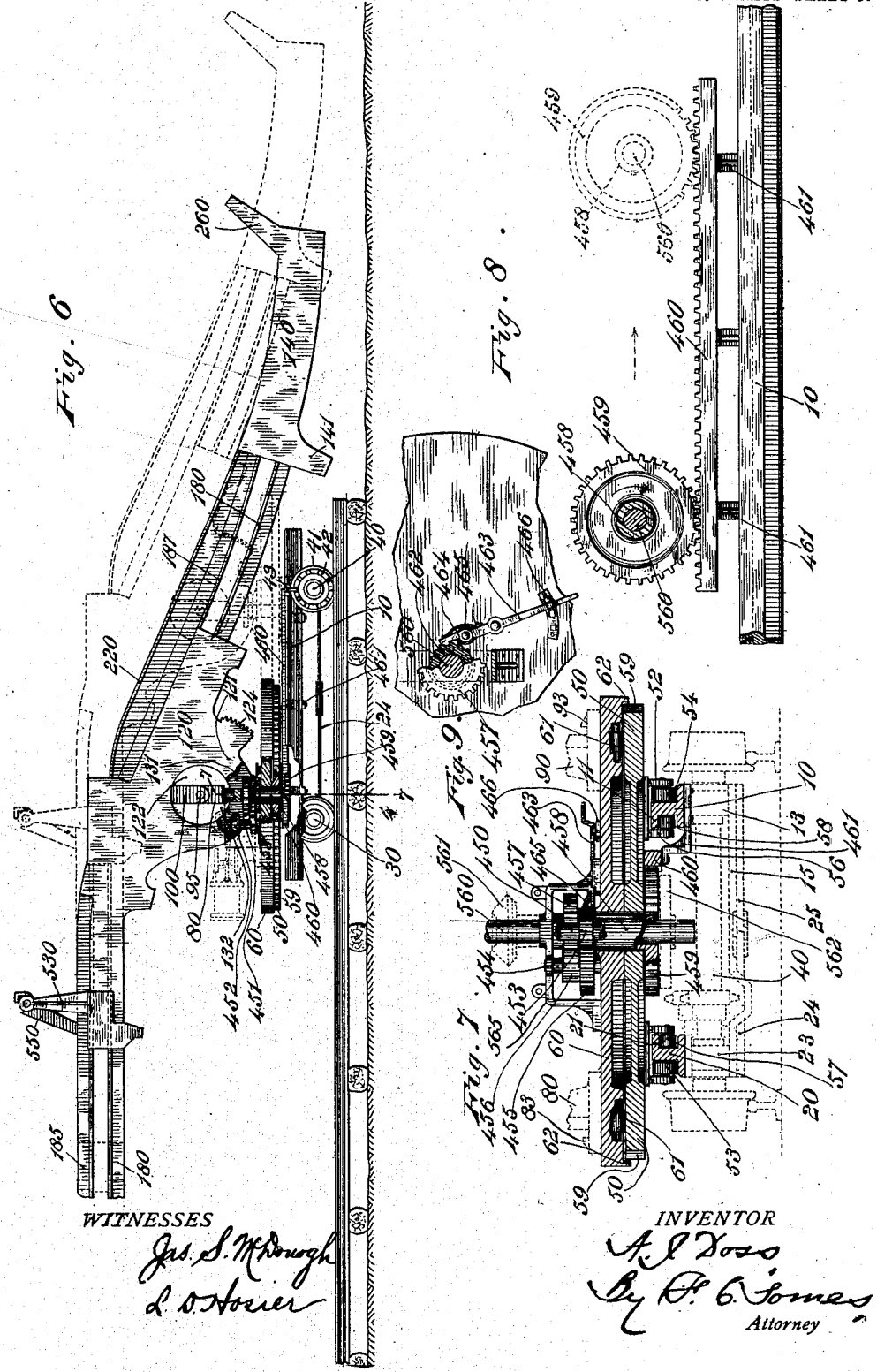

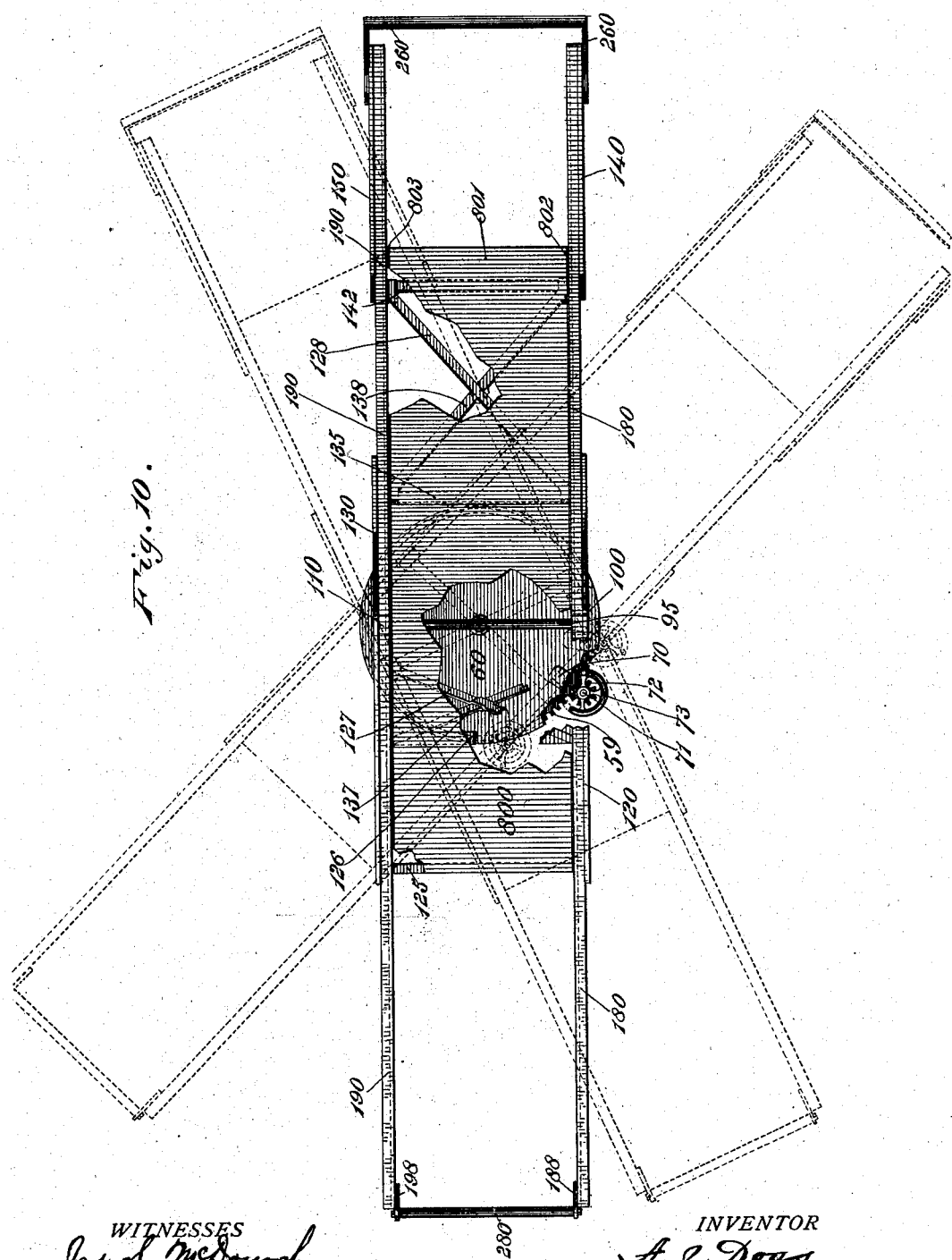

No. 757,284. PATENTED APR. 12, 1904.
A. J. DOSS.
LOADING MACHINE.
APPLICATION FILED SEPT. 4, 1903.
NO MODEL. 10 SHEETS—SHEET 5.
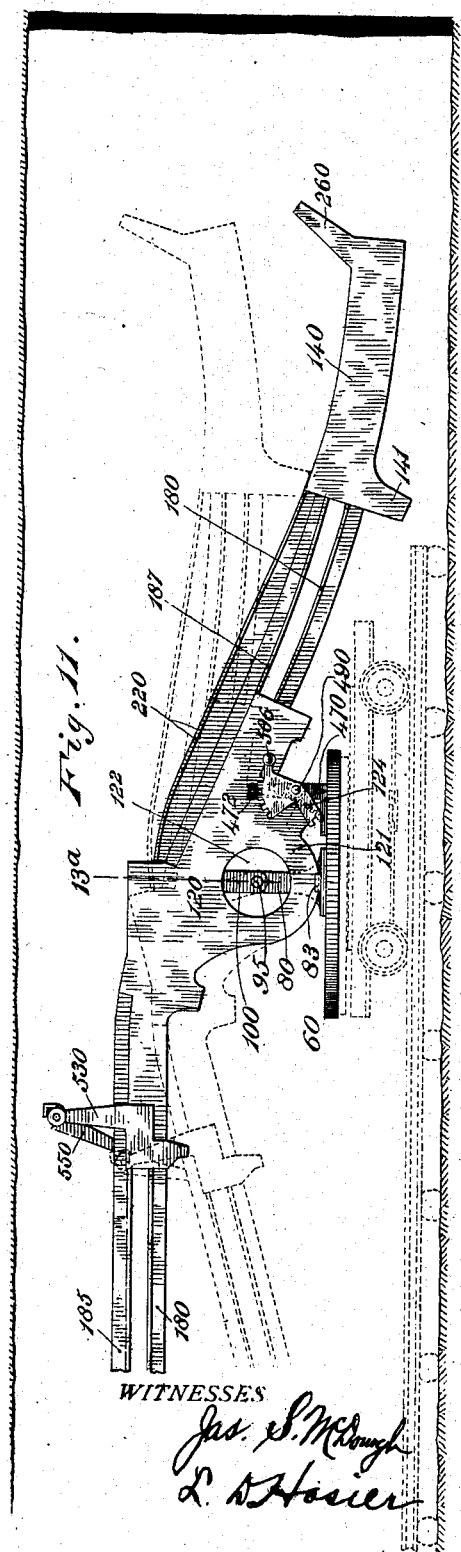
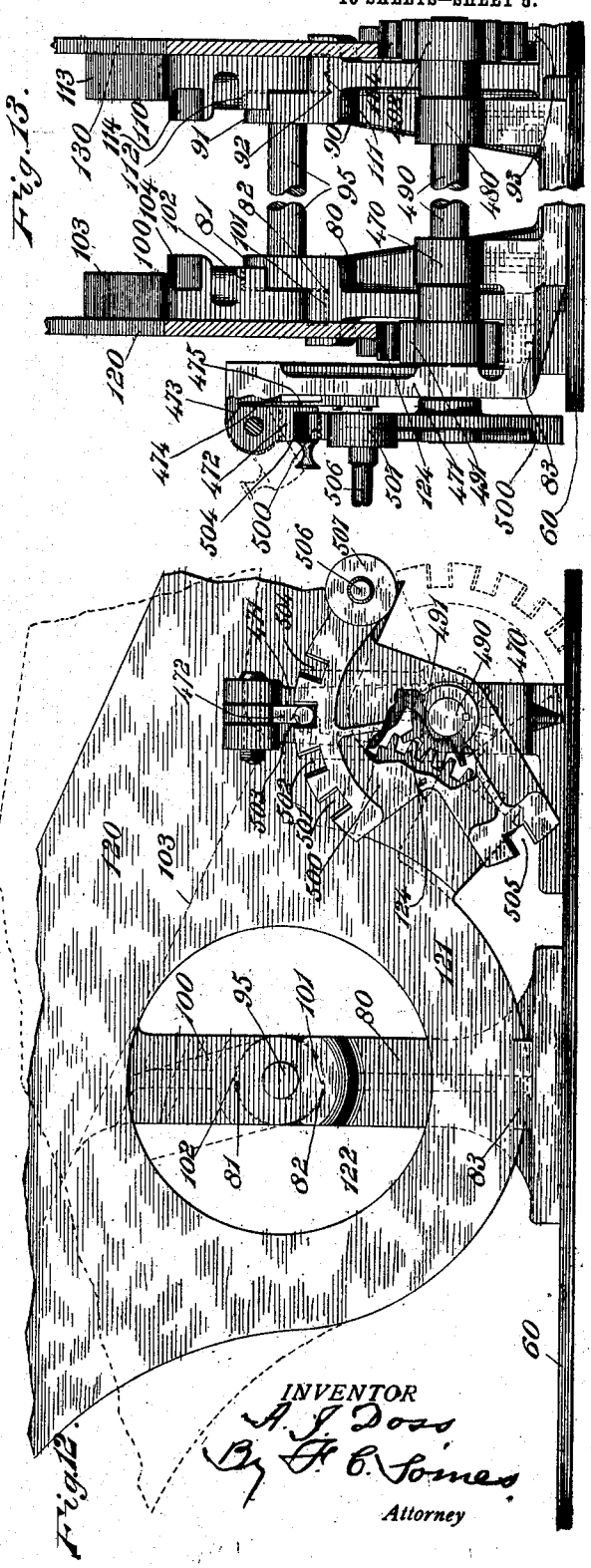
WITNESSES
INVENTOR
Attorney

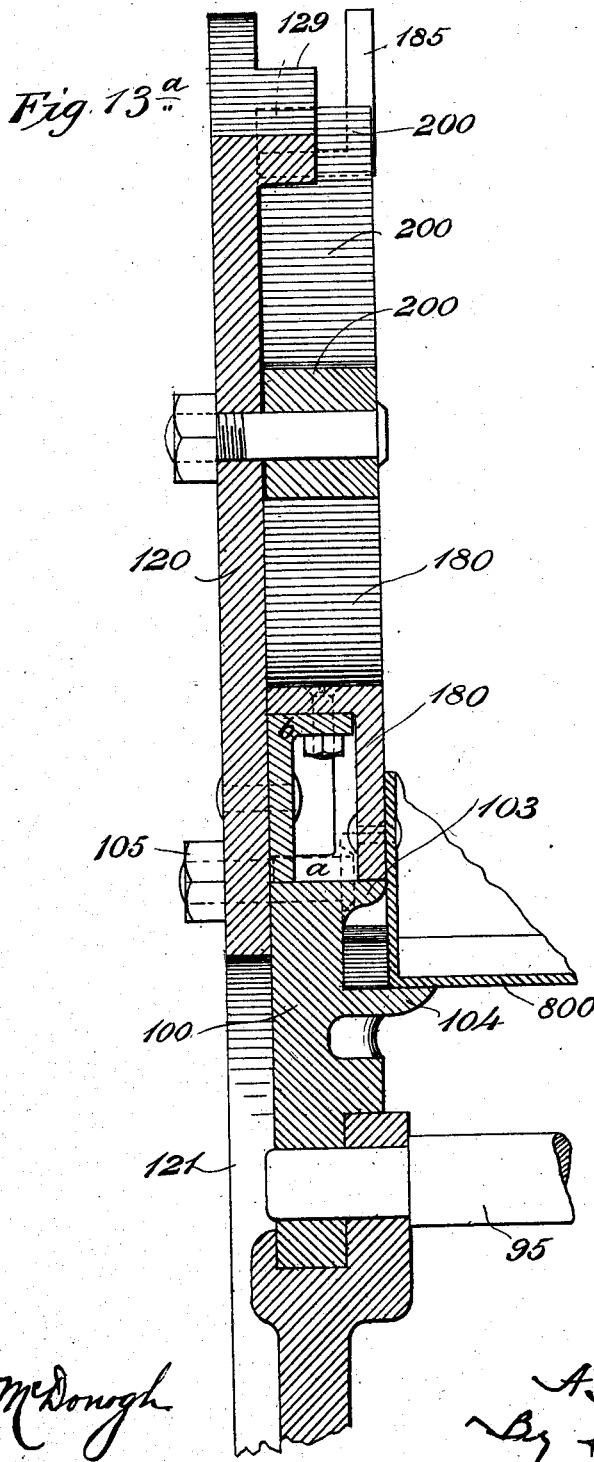

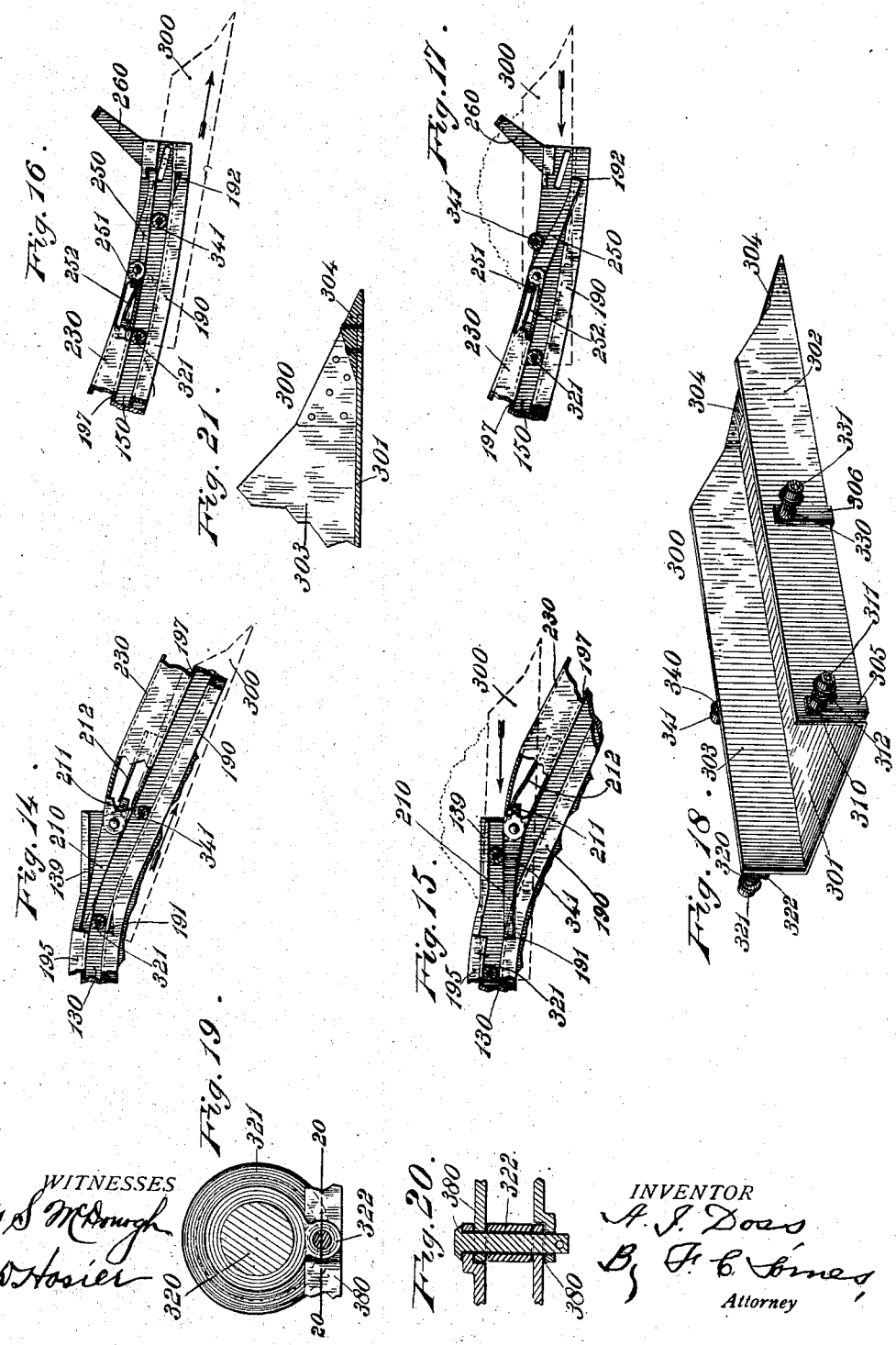

No. 757,284. PATENTED APR. 12, 1904.
A. J. DOSS.
LOADING MACHINE.
APPLICATION FILED SEPT. 4, 1903.
NO MODEL. 10 SHEETS—SHEET 8.
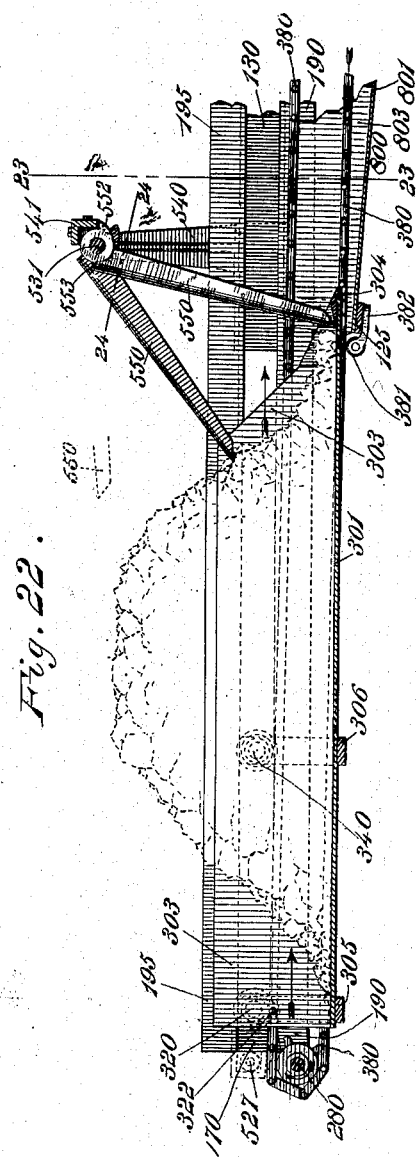
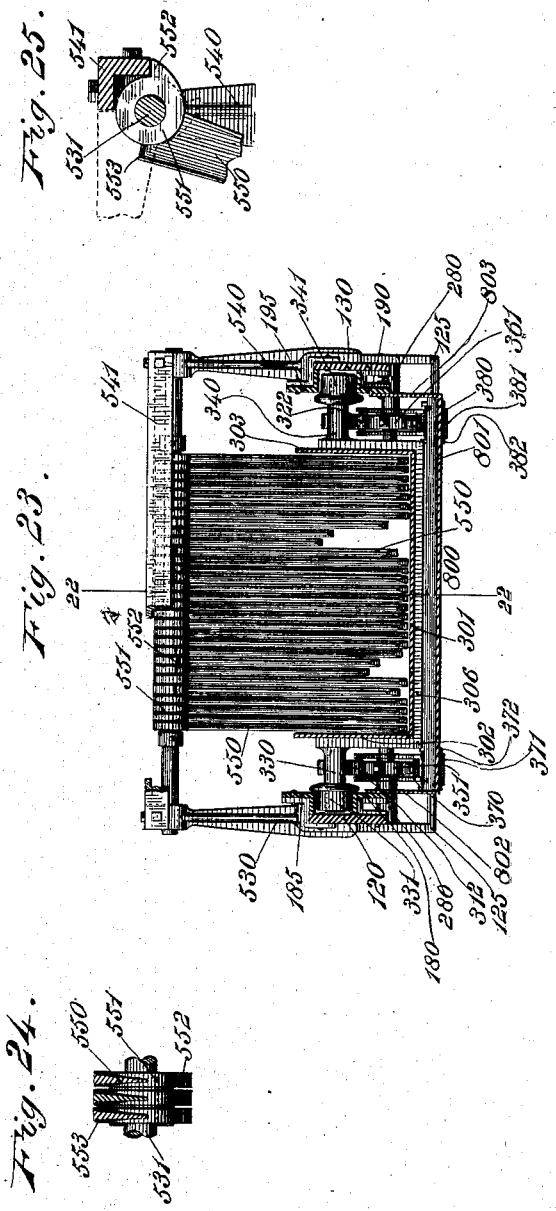
WITNESSES
Jas. S. McDonogh
L. D. Hosier
INVENTOR
A. J. Doss
By H. C. Somes
Attorney

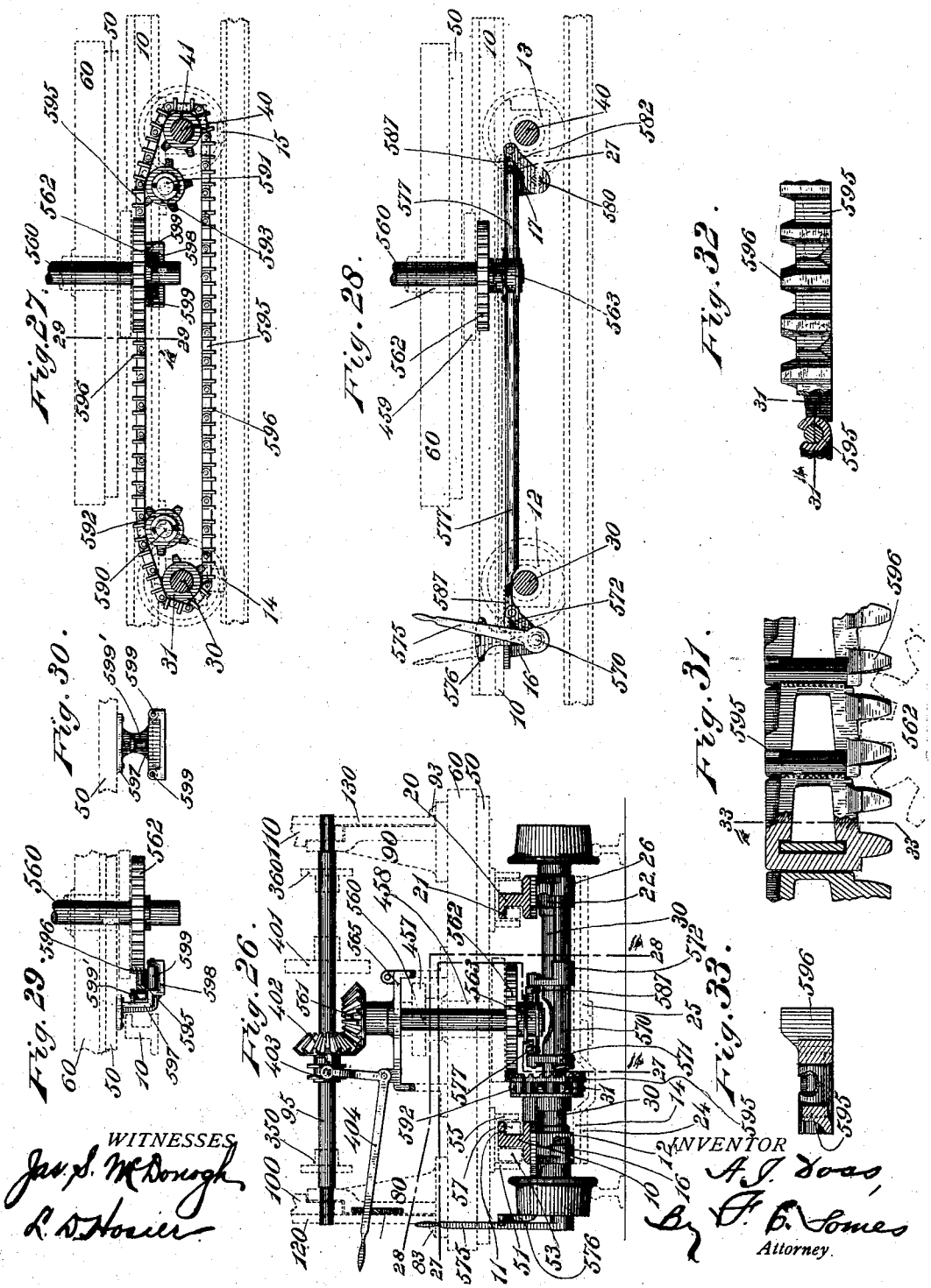

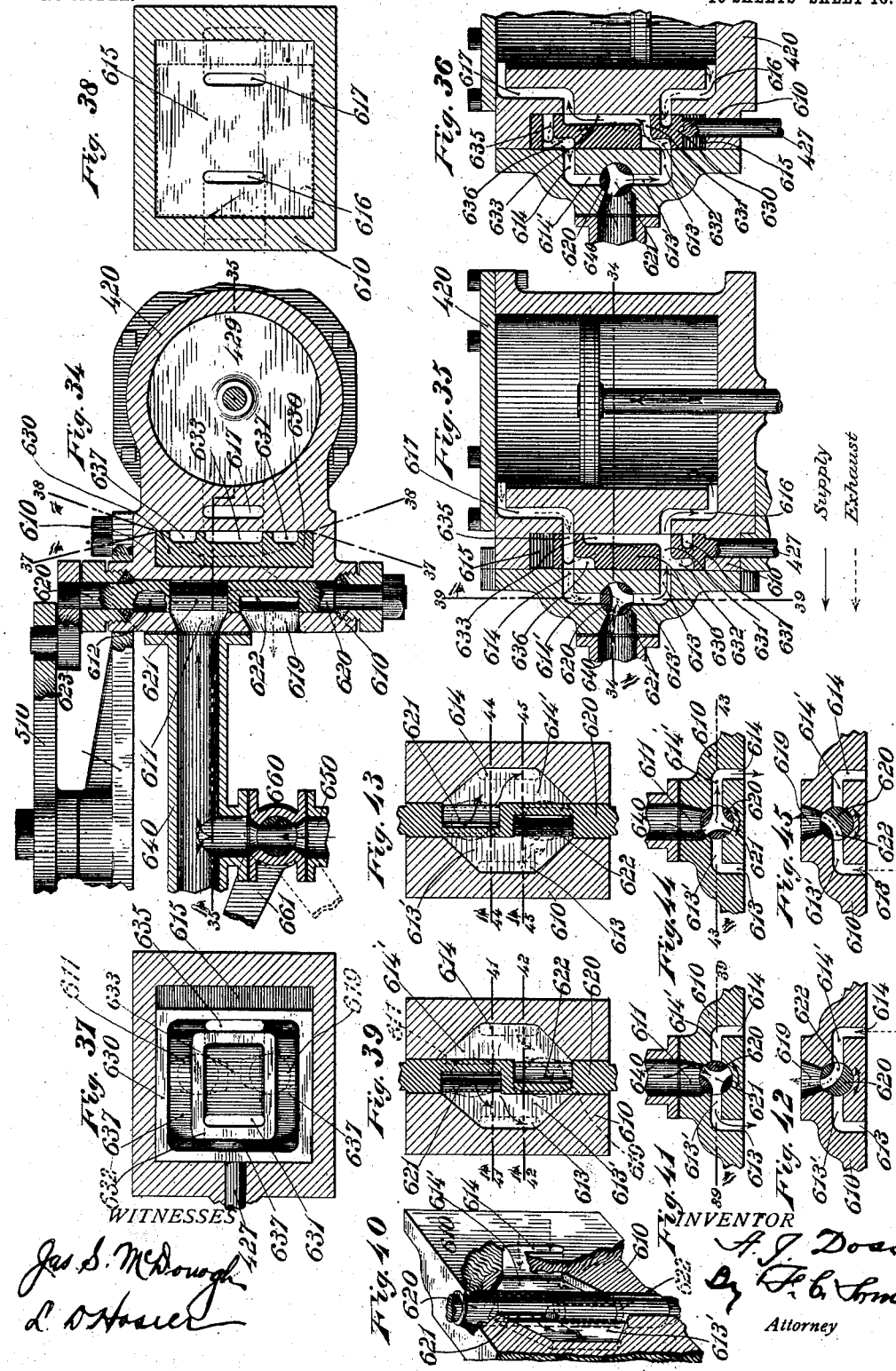

No. 757,284.

Patented April 12, 1904.

UNITED STATES PATENT OFFICE.

ANDREW JACKSON DOSS, OF SWITCHBACK, WEST VIRGINIA, ASSIGNOR TO JAMES ELLWOOD JONES, OF SWITCHBACK, WEST VIRGINIA.

LOADING-MACHINE.

SPECIFICATION forming part of Letters Patent No. 757,284, dated April 12, 1904.

Application filed September 4, 1903. Serial No. 172,016. (No model.)

*To all whom it may concern:*

Be it known that I, ANDREW JACKSON DOSS, a citizen of the United States of America, residing at Switchback, in the county of McDowell, in the State of West Virginia, have invented certain new and useful Improvements in Loading-Machines, of which the following is a specification.

This invention relates to a machine for transferring material—such as coal, ore, ashes, or other substances—from one point to another; and it is especially designed for loading coal from the floor of a mine onto the mine-car for carrying it out of the mine.

The loading of coal in mines has heretofore been generally done by manual labor, as the conditions of the mines were thought to be such as to prevent the practical use of machines for this purpose, owing to low ceilings, narrow passages, and small rooms in which the work is to be done.

The principal object of this invention is to provide a loading-machine adapted to operate in the contracted space of a coal-mine for loading onto cars for conveying it out of the mine the coal shot down by the usual blasting operation, and in carrying out this object I have devised a simple mechanism, preferably located on a car traveling on a mine-track, adapted to pick up the coal from the mine-floor, elevate it to a point over the mine-car, and deliver it into said car.

This loading-machine includes a traveling runway comprising an inclined portion, a traveling shovel reciprocating on said runway, and means for moving said shovel back and forth on said runway. The machine also preferably includes means for laterally oscillating the runway to take up coal at either side of the line of its travel, means for moving the runway lengthwise of its traveling support to change the position of thrust of the shovel, means for automatically reversing the movement of the shovel, means for striking off the surplus load taken up, means for automatically discharging the load from the shovel, means for moving the car carrying the runway in and out of the mine in any position of said runway on said car, and other features hereinafter described.

Figure 1 of the accompanying drawings represents a side elevation of a loading-machine embodying one form of this invention, said machine being shown as in operation within the mine for loading coal, the traveling shovel being shown in full lines at the delivery end of its runway and indicated in dotted lines in five different positions—to wit, in descending the runway, in entering the coal in front of the runway, in taking up coal at the end of its forward thrust, in ascending the inclined portion of the runway, and in entering the horizontal portion thereof toward the point of delivery. Fig. 2 represents a section on line 2 2 of Fig. 3 in double the scale of Fig. 1, parts being broken out. Fig. 3 represents a side elevation also in double the scale of Fig. 1 of the machine shown in Fig. 2, parts being broken out. Fig. 4 represents a transverse section on the same scale as Fig. 2, showing the clutch mechanism for throwing the driving sprocket-chains which operate the traveling shovel into and out of gear with the engine. Fig. 5 represents on the same scale as Fig. 2 a side elevation of the front side standard for supporting the loading mechanism, showing the lever for operating the clutch mechanism to throw the car-axles into engagement with the engine to effect the travel of the machine-car on the track and the lever for operating the clutches which connect the actuating mechanism of the traveling shovel with the driving mechanism. Fig. 6 represents on the same scale as Fig. 1 a side elevation of the machine-car, the carriage which travels longitudinally thereon, and the runway pivoted on said carriage and adapted to carry the shovel, (not shown,) this view including the mechanism for moving said carriage back and forth on said car, parts being broken out. Fig. 7 represents a transverse section of the traveling carriage, on a scale double the size of the previous figure, on line 7 7 of Fig. 6 looking toward the right, the body of the machine-car being indicated in dotted lines. Fig. 8 represents on the same scale as Fig. 7 a horizontal section of the mechanism for imparting a longitudinal traverse to the carriage carrying the loading mechanism. Fig. 9 represents on the same scale as Fig. 8 a horizontal section of a locking mechanism for holding the longitudinal traveling carriage in fixed position on the machine-car. Fig. 10 represents on the same scale as Fig. 1 a plan of the traveling carriage, the tilting runway supported thereon, and the means for oscillating the base to shift the runway laterally, as indicated in dotted lines. Fig. 11 represents on the same scale as Fig. 1 a side elevation of the machine-car, (in dotted lines,) the traveling carriage thereon, the tilting runway supported on said carriage, and the means for locking said runway when tilted in different positions. Fig. 12 represents on a scale four times the size of Fig. 11 a side elevation of a central fragment of the tilting runway and the locking device therefor. Fig. 13 represents on the same scale as Fig. 12 a transverse section of the runway and its supporting-standards and the mechanism for tilting it. Fig. 13$^a$ represents, on a large scale, a section on line 13$^a$ 13$^a$ of Fig. 11, showing the connection of the rails and chute with one of the side plates. Fig. 14 represents a detailed side elevation of the central portion of the inner face of the runway on the far side of the machine, showing the automatic switch which connects the down-track with the up-track of said runway, the switch being in its normal position and a part of the casing being broken out to show the spring which holds it there. Fig. 15 represents a similar view, showing the switch in closed position under the action of the front wheel of the loaded upwardly-traveling shovel. Fig. 16 represents a detailed side elevation of the front end portion of the runway at the far side of the machine, showing the front switch for connecting the down-track with the up-track, said switch being closed for the up-track by the front wheel of the shovel passing thereunder. Fig. 17 represents a similar view to that shown in Fig. 16, the switch being held in normal position under the action of its spring and the front wheel of the shovel being switched thereby onto the up-track. Fig. 18 represents a perspective view of the traveling shovel which moves back and forth on the runway. Fig. 19 represents an enlarged transverse section through one of the rear trunnions of the shovel, showing the connection thereof with the driving sprocket-chain. Fig. 20 represents a horizontal section on line 20 20 of Fig. 19. Fig. 21 represents an enlarged longitudinal section of the front portion of the shovel, showing a reinforcing-lip applied to the front edge thereof. Fig. 22 represents a longitudinal section on double the scale of Fig. 1 and on line 22 of Fig. 23 looking toward the right of the upper rear portion of the runway, the traveling shovel thereon, and the discharging means for said shovel. Fig. 23 represents on the same scale as Fig. 22 a transverse section on line 23 23 of Fig. 22 looking toward the left and illustrating different positions of the individual fingers constituting parts of the discharging means. Fig. 24 represents on a larger scale a transverse section of three fingers of the discharging means on line 24 24 of Fig. 22 looking upward. Fig. 25 represents an enlarged transverse section of the frame supporting the scraping-fingers of the discharge mechanism and the shanks of said fingers. Fig. 26 represents on double the scale of Fig. 1 a transverse section of the mechanism for imparting traction to the car for moving the machine within the mine, parts being shown in dotted lines. Fig. 27 represents on the same scale as Fig. 26 a longitudinal vertical section on line 27 27 of Fig. 26, showing the sprocket-gear chain and mechanism connected therewith for imparting traction to the axles of the machine-car. Fig. 28 represents on the same scale as Fig. 27 a longitudinal vertical section on line 28 28 of Fig. 26, showing the clutch mechanism for shifting the traction mechanism into and out of gear with the engine in any position in which the traveling carriage may be on the car. Fig. 29 represents on the same scale as Fig. 28 and on line 29 29 of Fig. 27 means for holding the sprocket-gear chain in contact with its driving-gear. Fig. 30 represents on the same scale as Fig. 29 an elevation of the inner side of the retaining device for the sprocket-gear chain. Fig. 31 represents on an enlarged scale a fragment of the sprocket-gear chain, partly in plan and partly in section on line 31 31 of Fig. 32, a portion of the driving-gear being shown in dotted lines. Fig. 32 represents on an enlarged scale a side elevation of the fragment shown in Fig. 31. Fig. 33 represents, also on an enlarged scale, a transverse section of the sprocket-gear chain on line 33 33 of Fig. 31 looking toward the right. Fig. 34 represents a greatly-enlarged transverse section on line 34 34 of Figs. 2 and 35, showing the cylinder of the duplex engine on the far side of the machine, the valve-chest therefor, the slide and reversing valves therein, means in part for actuating the reversing-valve, and the supply-pipes for the motive fluid. Fig. 35 represents on a similar scale a horizontal section on line 35 35 of Fig. 34 looking downward, showing the reversing-valve in position for the forward movement of the engine and the slide-valve in position for the outward stroke of the piston. Fig. 36 is a view corresponding to Fig. 35, showing the reversing-valve in the same position and the slide-valve in position for the inward stroke of the piston. Fig. 37 represents on the same scale as Fig. 36 a longitudinal section of the valve-chest on line 37 37 of Fig. 34 looking toward the left, showing the inner face of the slide-valve in elevation. Fig. 38 represents a section on the same line as Fig. 37 looking toward the right and showing the ports connecting the valve-chest with the cylinders. Fig. 39 represents on the same scale a vertical longitudinal section through the outer plate of the valve-chest on line 39 39 of Fig. 35 looking toward the left and on line 39 39 of Fig. 41 looking upward, the reversing-valve being in position for the forward motion of the engine. Fig. 40 represents a perspective view of a section of the outer plate of the valve-chest and the cylindrical reversing-valve therein. Fig. 41 represents on the same scale a horizontal section on line 41 41 of Fig. 39, taken through the supply-passage of the reversing-valve when the latter is in position for the forward motion of the engine. Fig. 42 represents on the same scale a horizontal section of the same parts on line 42 42 of Fig. 39, also looking downward, taken through the exhaust-passage of the reversing-valve when in position for forward motion of the engine. Fig. 43 represents a section corresponding to Fig. 39 on line 43 43 of Fig. 44 looking upward, showing the reversing-valve in reversed position. Fig. 44 represents a horizontal section on line 44 44 of Fig. 43 looking downward, taken through the supply-passage of the reversing-valve when in reversed position. Fig. 45 represents a horizontal section on line 45 45 of Fig. 43 looking downward, taken through the exhaust-passage of the reversing-valve when in reversed position.

The same characters of reference are used for the same parts in different figures.

A car traveling on the mine-track supports the loading mechanism and conveys it from place to place, as required. This car has preferably a skeleton frame comprising two longitudinal side rails 10 and 20, resting, respectively, on journal-boxes 12 and 13 and 22 and 23, supported on car-axles 30 and 40. These rails are preferably composed of suitable flanged metal. The rail 10 has bottom flanges projecting at both sides, whereby it is secured to the journal-boxes, and it has an inward longitudinal flange 11 at its upper edge. The rail 20 has corresponding bottom flanges for attachment to the journal-boxes and a similar inwardly-projecting flange 21 at its upper edge. The journal-boxes 12 and 22 are connected by a transverse brace 14 and the journal-boxes 13 and 23 by a transverse brace 15. Diagonal braces 24 and 25 also connect the journal-boxes and serve to strengthen the frame. Dependent brackets 16 and 17 are attached to the rail 10 near opposite ends thereof, and similar dependent brackets 25 and 26 are attached to the rail 20 near its opposite ends for the purpose hereinafter described.

The car is provided with an ordinary brake or any means for holding it stationary on the track. The means shown for this purpose comprise a slotted or notched flange 42 on one of the car-wheels 41 of the axle 40. A sliding pin 43 is adapted to pass through a hole in the side rail 10 and engage one of the slots of said wheel.

The loading mechanism is preferably mounted on a traveling carriage adapted to travel longitudinally on the machine-car for the purpose hereinafter described. This carriage in its preferable form comprises a traveling platform 50 in skeleton or other form and a rotary or swiveling base 60, adapted to turn thereon. The platform 50 is preferably circular and provided on its under side outside the rail 10 with dependent lugs 51 and 52, carrying antifriction-rolls 53 and 54, which rest on the outer bottom flange of the rail 10, and with dependent lugs 55 and 56 on the inside of said rail, carrying antifriction-rolls 57 and 58, which engage the under side of the flange 11 of said rail. The platform is also provided with similar lugs and rolls, which engage the rail 20, and on its periphery with a circular rack 59.

The swiveling base 60, preferably provided on its under side with antifriction-rolls 61, is mounted on the platform 50 and preferably provided with an annular downward flange 62, which encircles the upper edges of the circular rack 59 and protects it from dust or clogging material. A bracket 70 is secured to the edge of said base and projected beyond its periphery and carries a shaft 71, provided with a pinion 72, which meshes with the circular rack 59 of the traveling platform. A hand-wheel 73 is attached to the upper end of this shaft and serves as a means for turning the base on the platform, as shown in Figs. 1 and 10. The loading mechanism and the driving-engine are mounted on this swiveling base. The support for the loading mechanism comprises two standards 80 and 90, disposed at diametrically opposite points on the base 60. These standards are constructed of metal in substantial form, securely bolted to the base 60 and adapted to constitute a rigid support for the loading mechanism. The standard 80 is provided with a rounded convex bearing 81 at its upper end and also with a concave bearing 82 on its front face near its upper end, the said concave bearing being concentric with said convex bearing. The standard 90 is also provided at its upper end with a rounded convex bearing 91 and also with a concave bearing 92 on its outer face near said upper end, said concave bearing being also concentric with said convex bearing. The bases of these standards are provided on their outer faces with guide-lugs 83 and 93. A transverse shaft 95 is supported at the upper end of the standards 80 and 90 and coincides axially with said convex and concave bearings.

A runway is supported and preferably pivoted to render it tiltable about midway of its length on the standards 80 and 90. This runway in its normal working position comprises an elevated horizontal portion extending back of its central pivot and an inclined portion extending downwardly from the horizontal portion and continuous therewith in front of said pivot, said inclined portion being preferably curved in its lower part. The frame of this runway comprises two pivoted central supports 100 and 110 on opposite sides of the machine. The support 100 is provided at its lower end with a convex bearing 101, which fits the concave bearing 82 of the standard 80, and with a concave bearing 102, which fits over the convex bearing 81 of said standard 80, and the support 110 is correspondingly provided at its lower end with a convex bearing 111, which fits the concave bearing 92 of the standard 90, and with a concave bearing 112, which fits the convex bearing 91 of the standard 90.

The supports 100 and 110 are provided, respectively, with inclined ledges 103 and 113, as shown in Figs. 13 and 13ª and indicated in dotted lines in Fig. 12, and below said ledges with inward flanges 104 and 114, as shown in Figs. 13 and 13ª, these ledges serving as rests. These inclines serve as rests for the rails constituting parts of the track of the runway, as hereinafter described, and the flanges serve as supports for a coal-chute, hereinafter described. A central side plate 120 is integral with or connected to the central support 100 by bolts, as 105, or otherwise, and a central side plate 130 is integral with or secured to the central support 110, these plates being disposed at opposite sides of the machine. End plates 140 and 150 are disposed at opposite sides of the runway at the front end thereof, and end plates 160 and 170 are disposed at opposite sides of said runway at the rear end thereof. The central plates 120 and 130 have, respectively, downward circular extensions 121 and 131, as shown in Figs. 1, 3, 6, 11, 12, and 13, the lower edges of which are concentric with the pivot on which the runway swings or tilts, and these lower edges are just inside the guide-lugs 83 and 93, as shown in Figs. 11, 12, and 13, which tend to keep said plates in their vertical planes. These plates are provided with circular openings 122 and 132, through which come the actuating-levers, as hereinafter described. The upper portions of these plates preferably extend in a horizontal plane, considered with reference to the operative position of the machine, and the lower portions of said plates are downwardly inclined and provided with segmental racks 124 and 134, as clearly shown in Figs. 11, 12, and 13. These central side plates are connected with each other at their opposite ends by transverse braces 125 and 135 and an intermediate brace 126, also by cross-braces 127 and 137, as shown in Fig. 10. The front end plates 140 and 150 are provided at their rear ends with downward projections, as 141, connected with each other by a transverse brace 142 and with the lower ends of the central plates by cross-braces 128 and 138, as shown in Fig. 10.

The runway is provided with a continuous track extending from end to end and with a branch track in its front portion disposed over the main track, these tracks being adapted for the movement of a traveling shovel, as hereinafter described. The main track of the runway is composed of under rails 180 and 190, extending from end to end thereof continuously through the inclined and horizontal portions on opposite sides of the machine, and top rails 185 and 195, disposed above the rails 180 and 190, along the upper horizontal portion of the runway and top rails 187 and 197 above the rails 180 and 190 along the inclined front portion of the runway, the top rails being parallel with the corresponding parts of the under rails. The ends of the top rails 185 and 195 and of the top rails 187 and 197 terminate near the junction of the horizontal and inclined portions of the runway. The rails are secured to the side plates 120 and 130 in any suitable manner. Fig. 13ª shows an example of one means of attachment in which the rail 180 is secured to the side plate 120 by means of two angle-irons $a$ and $b$. The vertical web of the angle-iron $b$ is riveted to the plate 120, and the horizontal web of the angle-iron $a$ rests on the ledge 103. The rail 180, which is also of angle-iron, rests at its lower edge on the ledge 103 and is secured by its top horizontal web to the horizontal web of the angle-iron $b$ and by its vertical web to the vertical web of the angle-iron $a$. These angle-irons serve to strengthen and stiffen the connection. A branch track of the runway extends along the front inclined portion thereof, being disposed above the main track and connected with the latter at a point near the front end and at a point above the center of the runway. This branch track is composed of flanged rails 220 and 230, disposed on opposite sides of the machine and properly secured to the side plates. The front ends of the rails 180, 187, and 220 on one side of the runway are connected by a plate 140, and the rear ends of 180 and 185 are connected by a plate 160, and the front ends of the rails 190, 197, and 230 on the other side of the machine are connected by a plate 150, and the rear ends of the rails 190 and 195 are connected by a plate 170. Switches 200 and 210 are pivoted to the central side plates on the inner faces thereof and connect the rear end of the branch track with the main track. The switch 200 also connects the inner ends of the top rails 185 and 187, and the switch 210 connects the inner ends of the top rails 197 and 195. The hubs of these switches are provided with lugs 201 and 211, respectively, and springs 202 and 212 bear against these lugs and tend to hold the switches in position to keep the main track normally open. Switches 240 and 250 are disposed on opposite sides of the runway and adapted to connect the front ends of the main and branch tracks. The hubs of these switches are provided with lugs 241 and 251, and springs 242 and 252 engage said lugs and tend to hold the switches normally in open position for the branch track. The under rails 180 and 190 are provided at the upper rear ends of their inclined portions with recesses 181 and 191, respectively, which serve as seats for the ends of the switches 200 and 210, and these rails are also provided at their front ends with rests 182 and 192, which serve as seats for the switches 240 and 250.

The runway is provided at its front end with a striker 260, which spans the space between the front end plates at a sufficient elevation above said plates to strike off surplus coal from the shovel after being loaded preparatory to its ascent on the runway. This striker when constructed as shown is in the form of a yoke, the sides of which are integral with or attached to the end plates 140 and 150. The transverse bar acts as a brace as well as a striker. The runway is also provided on its under side with a chute or casing 800, comprising a transverse bottom plate 801, and attaching-flanges 802 and 803 at opposite sides, as shown in Figs. 1, 2, 3, 10, 13ᵃ, 22, and 23. This chute or casing extends from near the front end of the horizontal upper portion of the runway to near the lower end of the inclined portion thereof and serves to catch any coal that may fall from the traveling shovel, hereinafter described. The rear horrizontal portion of the runway is left open for discharging coal from the traveling shovel into the car underneath that portion of the runway, as shown in Fig. 1.

A rod 280 is disposed at the rear end of the runway in lugs 188 and 198, attached to the track. This rod serves as a brace for the rear end of the runway and also as a support for idler sprocket-wheels, hereinafter described.

A traveling shovel 300 is designed to be moved along the runway and to scoop up a load at the lower front end of the runway and deliver it at the upper rear end thereof. This shovel is designed to be of large capacity, capable of carrying a large portion of a ton, more or less, of coal, and it may be of any suitable construction to adapt it for this purpose. It comprises when constructed as shown a flat bottom 301 and vertical sides 302 and 303, the latter being beveled at the front end of the shovel. The front edge of the bottom of the shovel is provided with a heavy beveled reinforcing-strip 304, composed of hardened steel or other suitable material to avoid wear and breakage. This strip is provided in the rear portion of the under side with a recess for receiving the front end of the shovel-bottom, the bottom and strip being riveted together, as shown in Fig. 21. The body of the shovel is reinforced and strengthened by two angled bands 305 and 306, extending across the bottom and up the sides, the band 306 being disposed, preferably, in the rear of the center of the shovel in order to give the latter a long forward stroke. The shovel is provided with two sets of supports which engage the track of the runway, a rear set located at the rear portion of the shovel and a forward set located in front of the rear set and back of the front of the shovel, preferably near the center thereof. These supports may be in the form of trunnions provided with flanged wheels on rollers, or they may be in any other suitable form adapted to engage the tracks of the runway. In the construction shown the rear supports are in the form of trunnions 310 and 320, attached to the rear band 305 and provided with flanged wheels 311 and 321, and the forward supports are in the form of trunnions 330 and 340, attached to the band 306 and provided with flanged wheels 331 and 341. The trunnions 310 and 320 are also provided with dependent lugs 312 and 322, respectively. When this shovel is in operation in the runway, both rear and forward supports 310 and 320 and 330 and 340 travel between the upper and lower rails of the main track in the forward movement, and on the backward movement the forward supports 330 and 340 travel on the branch track before described. On the forward movement of the shovel the forward supports lift the switches 240 and 250 at the front end of the main track and pass beyond said switches a sufficient distance to permit the latter to fall back into normal position. Then on the backward movement of the traveling shovel these rollers ride up over said switches onto the branch track, elevating the front of the shovel and holding the shovel in a horizontal position, or approximately so. When the forward supports reach the upper end of the branch track, they pass under the flanges 129 and 139 and over the switches 200 and 210, depressing said switches against the resilience of their springs 202 and 212 and after riding over said switches pass onto the upper horizontal portion of the main track. After the passage of the shovel the springs return the switches to their normal positions, holding the branch track closed. The location of the forward supports back of the front of the shovel enables the latter to project beyond the runway for scooping up material.

Means are provided for reciprocating the shovel on the runway to cause the taking up of material at the front end thereof and the delivery of the material at an elevated point in rear thereof. Any suitable mechanism may be employed for this purpose. The mechanism shown comprises a shaft 95, provided with two driving-pulleys, preferably in the form of sprocket-wheels 350 and 360, disposed near opposite ends of said shaft. Idler end pulleys, also preferably in the form of sprocket-wheels 351 and 361, are disposed on the rod 280. Idler end pulleys or sprocket-wheels 352 and 362 are disposed on inwardly-projecting studs attached to the front end plates 140 and 150, and intermediate idler-pulleys or sprocket-wheels 353, 354, and 355 are disposed on inwardly-projecting studs attached to the central side plate 120, and corresponding intermediate idler sprocket-wheels 363, 364, and 365 turn on inwardly-projecting studs attached to the central side plate 130. A flexible strap, preferably endless and in the form of a sprocket-chain 370, passes over the end idler sprocket-wheels 351 and 352 and over the intermediate sprocket-wheels 353, 354, and 355 and is engaged and driven by the driving sprocket-wheel 350 on the shaft 95. A corresponding strap, preferably endless and in the form of a sprocket-chain 380, is disposed at the other side of the machine and passes over the end idler sprocket-wheels 361 and 362 and wheels 363, 364, and 365 and is engaged by the driving sprocket-wheel 360 on said shaft 95. Brackets 372 and 382 are attached at opposite sides of the machine to the cross-bar 125 at the upper end of the chute 800 and provided with antifriction-rolls 371 and 381, which prevent sagging of the sprocket-chains 370 and 380 and avoid contact of said chains with the edge of the chute. The sprocket-chain 370 is connected to the lug 312 on the traveling shovel, and the sprocket-chain 380 is connected to the lug 322 on the opposite side of the traveling shovel. The pins which connect the lugs with adjacent links of each chain serve as pivots for said links, so that the chain is flexible throughout, including its point of connection with the traveling shovel. The driving sprocket-wheels 350 and 360 are loose on the shaft 95, and clutches 356 and 366 are splined on said shaft and engage said driving sprocket-wheels, respectively, for locking them to turn in unison with the shaft when the traveling shovel is to be moved. Both these clutches are preferably operated by a single lever 390. The bell-crank levers 356' and 366' are pivoted, respectively, on the brackets 357 and 367, attached to the standards 80 and 90, the upper arms of the bell-crank levers being connected with the clutches and the lower arms thereof engaging slots 391 and 392 in said lever, which permits slight play of said ends. A downward thrust of the lever 390 disengages both clutches simultaneously from said driving sprocket-wheels, and an upward thrust thereof causes the clutches to engage the sprocket-wheels and bring the sprocket-chains into operation.

The shaft 95 is provided with a gear-wheel 401 fixed thereon, with a beveled gear-wheel 402 loose thereon, and with a clutch 403, splined on said shaft and adapted to engage said beveled gear-wheel. A lever 404 is connected with said clutch for operating it. A lever-lock 405 is attached to the standard 80 and provided with two series of notches, one for the lever 390 and the other for the lever 404, whereby said levers are respectively held in the positions into which they are adjusted by the operator. The shaft 95 receives and imparts motion in any suitable manner.

A motor of any suitable design or construction is mounted on the table 60. A duplex compressed-air motor is preferable for this purpose, being supplied with compressed air from the compressed-air mains laid within the mines; but an electric or steam motor might also be used. The motor shown comprises two cylinders 410 and 420, attached, respectively, to standards 411 and 421 and provided at its opposite ends with the usual driving-cranks 413 and 423, having pitmen 414 and 424 connecting said cranks with the usual cross-heads, to which are attached the piston-rods of said cylinders. This shaft is also provided with the usual valve-actuating eccentrics 415 and 425. A driving gear-wheel 431 is mounted loosely on said driving-shaft and meshes with the gear-wheel 401 on the shaft 95 for imparting motion to the latter. A clutch 432 is splined on the driving-shaft and engages the driving gear-wheel 431, and a lever 433, pivoted on a bracket 434, attached to the bed-plate 412, engages said clutch and extends to the front side of the machine in position to be engaged by the operator.

Means are provided for causing the carriage which carries the loading mechanism to travel back and forth on the car to advance the thrust of the shovel in the pile of coal on successive strokes or, if desired, on the same stroke. Any suitable means may be employed for this purpose. The means herein shown in Figs. 2, 3, 6, 7, and 8 comprise a beveled gear-wheel 440, loose on the shaft 430, and a clutch 441, splined on said shaft and adapted to engage said beveled gear-wheel, said clutch being operated by a clutch-lever 442. A vertical stud-bearing 450 is bolted to the base 60, and a sleeve 451 turns thereon. This sleeve is provided at its upper end with a beveled pinion 452 and at its lower end with a pinion 453. A stud-bearing 454 is mounted on the bed-plate adjacent to the stud-bearing 450, and a gear-wheel 455 turns on said stud-bearing 454 and is engaged by the pinion 453. The hub of this gear-wheel 455 is provided with a pinion 456, which engages the gear-wheel 457 on a rotary sleeve 458, which turns in a central opening in the rotary base 60 and the platform 50 and is provided with a collar which rests on the upper face of said base, as shown in Figs. 6 and 7. This rotary sleeve is provided at its lower end with a large gear-wheel 459. A stationary rack 460 is mounted on brackets, as 461, secured to the under part of the rail 10. The gear-wheel 459 meshes with this rack and propels the carriage forward or backward, according to the direction of motion imparted to said wheel. This intermediate gearing just described tends to reduce the speed, so as to give a slow movement to the carriage in its backward and forward adjustments.

Means are provided for locking the carriage in fixed position on the car. The means shown in Fig. 9 for this purpose comprise a ratchet-hub 462, attached to the gear-wheel 457, a lever 463, provided with a pawl 464 and adapted to engage said ratchet-hub, and with a spring 465 for holding said pawl against said ratchet-hub. A lever-lock 466 is provided with a series of studs between which the lever may be adjusted into position to lock or release said ratchet-hub. This mechanism is arranged to lock the base firmly at any point of its forward movement, permitting the propelling mechanism to turn freely for said movement. When it is desired to shift the table in a backward direction, the pawl is released from the ratchet-hub by a shifting of the lever, whereby the table is free to be moved back as desired.

The runway is adapted to swing in a vertical plane, so as to lift its forward end and depress its rear end to facilitate the travel of the car within the mine for operation within the mine-rooms and also to enable the forward end of the runway to be adjusted to the different heights or inequalities of the mine-floors. Any suitable means may be employed for this purpose, such as a worm-gear and worm. The means shown comprise shaft-bearings 470 and 480, fastened to the table 60 near the front end thereof. The shaft-bearing 470 on the front side of the machine is provided with a bracket 471, the upper end of which is provided with a pivoted latch 472. A transverse shaft 490 turns in the shaft-bearings 470 and 480. This shaft is provided with segmental pinions 491 and 492, which engage, respectively, the segmental racks 124 and 134 of the central side plates of the runway. This shaft is also provided with a notched segment 500, having a group of notches 501, 502, 503, and 504 disposed adjacent to each other and the notch 505 disposed apart from the group. This segment is also provided with a handle 506 and with a counterweight 507. The latch 472 is adapted to engage either of the notches 501 to 504 for holding the runway in working position and to engage the notch 505 for holding it in traveling position, as shown in dotted lines in Fig. 11. To effect the adjustment, the operator lifts the latch 472 and grasps the handle 506 of the segment, turning the latter into the desired position to secure the proper incline of the runway, then lowers the latch into the notch, which holds the runway in position.

The shank of the latch 472 is provided with angular shoulders 473 and 474, which are engaged by a spring 475. When the latch is in a locking position, the spring 475 engages the shoulders 474 and holds it in a closed position, and when the latch is open the spring engages the shoulder 473 and holds the latch in open position.

The runway is turned laterally to engage the coal pile at different points by means of the hand-wheel 73, the shaft 71, pinion 72, and circular rack 59, hereinbefore described and clearly shown in Fig. 10.

The machine is preferably provided with automatic means for reversing the movement of the traveling shovel at each end of the runway. These means are preferably mechanism for automatically reversing the engine or motor, and for this purpose any suitable means may be adopted. The means shown comprise a reversing-lever 510, pivoted on the cross-beam 422, which extends between the cylinders of the duplex engine, said lever being provided with a handle 511 at its outer end and with slots 512 and 513 on opposite sides of its pivot, said slots being engaged by valve-cranks connected with the respective cylinders, as hereinafter described. The outer end of the reversing-lever is also, preferably, provided with a friction-roller 514. A lever 520 is pivoted on the central front plate 120 and provided at its lower end with a yoke 521, which engages the outer end of the reversing-lever 510 at the point where the friction-rollers are disposed. A socket 143 is attached to the front end plates 140, and a sliding block 521 is movable in said socket. The front end of the sliding block is provided with an inwardly-projecting stud 522, preferably carrying a friction-roller, as shown in Figs. 2 and 3. A rod 525 connects the upper end of the vertical lever 520 with the sliding block 521. The end plate 160 on the front side of the machine is provided with a similar inclined socket 161, and a sliding block 526 is movable in said socket and provided at its outer end with an inwardly-projecting stud 527, preferably carrying an antifriction-roller. A rod 528 connects the upper end of the lever 520 with the inner end of the sliding block 526. When the traveling shovel reaches the end of its forward stroke, or nearly so, the front wheel 331 of the shovel strikes the stud 522 of the slide 521 and moves said slide forward. This forward movement of the slide pulls the rod 525 and swings the lever 520, whereby the reversing-lever 510 is shifted into the position shown in dotted lines in Fig. 3. At the same time the rod 528 pulls the slide 526 forward. This movement of the lever reverses the engine and causes the loaded shovel to travel backward on the runway. When the traveling shovel reaches the end of its rearward stroke, or nearly so, the rear wheel 311 comes in contact with the stud 527 of the slide 526, which was pulled forward on the front stroke of the shovel, and pulls said slide backward. This backward movement of the slide 526 pulls the rod 528 and swings the vertical lever 520 into the position shown in full lines in Fig. 3, also pulling at the same time the rod 525 and shifting the slide 521 into position to be again actuated on the forward stroke of the shovel. This movement of the lever 520 shifts the reversing-lever 510, whereby the engine is reversed and the traveling shovel is started on its forward stroke again.

Means are provided for unloading the shovel automatically after it reaches the point of delivery. These means may consist of a scraping device which operates to scrape out the contents of the shovel at the commencement of the forward stroke. This scraper is preferably composed of a series of fingers that ride automatically over the mass of coal in the shovel on its rearward stroke and adapt themselves to the inequalities of the load. For supporting this scraper standards 530 and 540 are attached to the rear ends of the central side plates 120 and 130, and a rod 531 and an angled cross-bar 541 are supported at the upper ends of said standards. The scraper proper is composed of a series of fingers 550, which are provided with hubs 551 at their upper ends strung side by side on the rod 531. The hubs 551 are provided with shoulders 552, which engage the lower edge of the angled cross-bar 541 when the fingers are in active position, and with shoulders 553, which engage the upper edge of said bar when the fingers are thrown upward to their extreme limit. As the traveling shovel loaded with coal travels backward in the rear portion of the runway it passes between the standards 530 and 540 and under the rod 531, the rear end of its load engaging the fingers 550 and swinging them in upward position. The load on the shovel has been struck off by the striker 260 at the front end of the runway, so as not to be too high to pass under said rod. As the load of the shovel passes under the fingers on its backward movement the latter ride over the top thereof, and after the load has passed the fingers the latter swing down into vertical position, or nearly so, ready to engage the load on the next forward movement of the shovel. In Fig. 22 the traveling shovel is shown as having just started on its forward stroke, containing the load which it gained on its previous forward stroke. As the shovel moves forward the load is brought into contact with the fingers in downward position, as shown in Figs. 22 and 23, and the fingers which are prevented from swinging forward act as scrapers to discharge the load as the shovel moves forward, the runway being open at its rear end under the shovel. The shoulders 552 on the hubs of the fingers serve to hold the latter in position to escape the bottom of the shovel, so as to prevent friction on shovel or fingers. It is designed that the mine-car for receiving the load will be in position on the track underneath the upper rear portion of the runway when the contents of the shovel are discharged.

Suitable means are provided for imparting traction to the car to take it into and out of the mine. Any suitable means, preferably operated by the same motor that operates the loading-machine, may be employed. The means shown comprises a vertical shaft 560, disposed in the sleeve 458 and having a bearing in the bracket 565 and provided at its upper end with a crown-wheel 561, keyed thereto, and at its lower end underneath the frame of the car with a gear-wheel 562, loose on said shaft. A clutch 563, splined to the shaft, is adapted to engage the hub of the gear-wheel and lock it to turn with the shaft. Means are provided for actuating the clutch in any position in which the traveling carriage may be. For this purpose two transverse shafts 570 and 580 are disposed in dependent brackets at the front and rear of the car-frame, as shown in Figs. 26 and 28. The rear shaft 570 is provided with cranks 571 and 572, and the shaft 580 is provided with corresponding cranks, as 582. The shaft 570 is provided with an actuating-lever 575, and a lever-lock 576, attached to the frame, serves to hold said lever in either of its two positions. The crank 571 on the shaft 570 is connected with its corresponding crank on the shaft 580 by an actuating-bar 577, and the crank 572 on the shaft 570 is connected with the crank 582 by the bar 587. These bars 577 and 587 are always in engagement with the clutch 563 on opposite sides thereof, the clutch traveling between the bars as the carriage moves backward and forward on the car. When the lever 575 is lifted from its full-line position in Fig. 28 into its dotted-line position, it raises both the bars 577 and 587 and lifts the clutch into engagement with the hub of the gear 562, which locks said gear to the vertical shaft 560, and when it is shifted into the full-line position said clutch is disengaged, as shown in Fig. 28. The engagement of the clutch causes motion to be transmitted to the axles of the car by the gear 562, as hereinafter described.

The car-axles 30 and 40 are respectively provided with sprocket-wheels 31 and 41, as shown in Fig. 27. Studs 590 and 591 are attached to the rail 20 adjacent to the car-axles and are provided, respectively, with idler-sprocket pinions 592 and 593. A sprocket-chain 595 passes over the sprocket-pinions 31 and 41 and 592 and 593. This sprocket-chain is provided with lateral teeth 596, which serve as gear-teeth and engage the gear-wheel 562 on the vertical shaft 560.

A dependent bracket 597 is attached to the under side of the platform 50 and provided with a horizontal guideway 598 and a vertical guideway 599', the horizontal guideway being preferably provided with antifriction-rolls 599 at its opposite ends and the vertical guideway being preferably in the form of an antifriction-roll. These guideways form an angular guide for holding the sprocket-chains 590 against sagging and in position of engagement with the gear-wheel. When the clutch-lever 575 throws the clutch 563 into engagement with said gear-wheel, motion is imparted through the sprocket-chain to the cax-axle, and the car is made to travel in either direction, according to the direction of the motion of said shaft, which is controlled by the direct or reverse action of the engine. To enable the motor to operate as a traction-engine for the car, the lever 510 may be disengaged from the yoke at the lower end of the lever 520, as shown in Figs. 1 and 3. The sprocket-chain referred to thus has a double function, being provided with the ordinary sprockets, which engage the sprocket-wheels, and with the lateral gear-teeth, which engage the gear-wheel, forming a combined gear and sprocket-chain.

The engine or motor used is preferably duplex and preferably provided with valve mechanism, now to be described. The cylinders 410 and 420 are provided, as usual, with valve-chests 600 and 610, which are disposed on the inner adjacent sides of said cylinders. These valve-chests are connected by a transverse pipe 640, to which a common supply-pipe 650 is connected between the cylinders for supplying the motive fluid thereto. This supply-pipe is provided with a stop-cock 660. The valve mechanism will be described in connection with the cylinder 420, and it is understood that similar or equivalent valve mechanism may be used in connection with the cylinder 410. The valve-chest 610 is provided on its outer face with an inlet-port 611, with which the pipe 640 connects, and below said inlet-port with an outlet or exhaust port 619, which opens into the atmosphere or into an exhaust-pipe. This valve-chest has a reversing-valve chamber 612, with which said inlet and outlet ports communicate, and with a longitudinal slide-valve chamber 615, the reversing-valve chamber when constructed as shown being at right angles to the slide-valve chamber. An angular channel 613 connects the reversing-valve chamber with the slide-valve chamber near the inner end of the latter, and an angular channel 614 connects the reversing-valve chamber with the slide-valve chamber near the outer end of the latter. The angular channel 613 is provided with a mouth 613', which is enlarged or broadened vertically where it opens into the valve-chamber 612 to enable said channel to connect, through the medium of the valve 620, with either the inlet-port 611 or the exhaust-port 619, and the channel 614 is also provided with a mouth 614', which is also broadened vertically where it opens into the reversing-valve chamber 612, opposite the mouth 613' of the channel 613, to enable said channel 614 also to connect, through the medium of said reversing-valve, with either the outlet-port 619 or the inlet-port 611 of the valve-chest. An angular channel 616 connects the slide-valve chamber with the crank end of the cylinder, and an angular chamber 617 connects said slide-valve chamber with the head end of the cylinder. A cylindrical reversing-valve 620 fits in the valve-chamber 612 and is provided with a three-way passage 621 in the same plane with the inlet-port 611, adapted to connect said inlet-port with either the channel 613 or the channel 614 and with a two-way passage 622, disposed in a plane below the three-way passage 621 in line with the exhaust-port 619, and adapted to connect said exhaust-port with said channels 613 and 614. This cylindrical valve is provided with spindle extensions at its opposite ends, which project through the top and bottom of the valve-chest, the joints being made tight by stuffing-boxes or otherwise. The upper end of the valve-spindle is provided with a crank 623, the wrist-pin of which is connected with the reversing-lever 510, heretofore described.

A slide-valve 630 is disposed in the slide-valve chamber 615 and is provided with an actuating-valve rod 427, which is connected with an eccentric on the engine-shaft, as hereinbefore described. The slide-valve is provided with a port 631, which serves as a supply-port during the forward motion of the engine and as an exhaust-port during the backward motion thereof, and with a port 635, which serves as an exhaust-port during the forward and as a supply-port during the backward motion of the engine. The slide-valve is also provided on its outer face with a short lengthwise channel 632, which serves as an elongated mouth for the outer end of the port 631 and keeps said port always in register with the port 613 of the valve-chest in any position of the slide-valve and on the same face with a short channel 636, which serves as an elongated mouth for the outer end of the port 635 and keeps said port always in register with the chest-channel 614. The slide-valve is provided on its inner face with a long lengthwise channel 633, which serves as an elongated inner mouth for the port 631 and enables said port to intermittently connect with the cylinder-channel 617. The slide-valve is also provided with a circuitous channel 637, which surrounds the channel 633 and connects at its meeting ends with the port 635, enabling said port to connect alternately with the cylinder-channels 617 and 616. When the engine is moving forward and the piston is on its outward stroke, as shown in Fig. 35, the port 635 directly connects the valve-chest channel 613 with the cylinder-channel 616 for supplying the motive fluid in front of the piston, as shown in Figs. 34, 35, 39, and 41. The circuitous channel 637 establishes communication for exhausting the head end of the cylinder between the cylinder-channel 617 and the valve-chest channel 614, leading through the lower two-way passage 622 of the valve 620 to the exhaust, as shown in Figs. 34, 35, 39, and 42, and on the inward stroke of the piston the port 631, with its elongations 632 and 633, establishes communication between the valve-chest channel 613 and the cylinder-channel 617 for supplying motive fluid behind the piston, as shown in Figs. 36, 39, and 41, and the circuitous channel 637 establishes communication between the cylinder-channel 616 and the chest-channel 614, leading through the two-way passage 622 of the valve 620 to the exhaust, as shown in Figs. 36, 39, and 42. When the reversing-valve 620 is shifted into the position shown in dotted lines in Figs. 2 and 3 and in section in Figs. 43, 44, and 45, the supply and exhaust of motive fluid take courses in reverse of that just described. For instance, assuming the parts to be in the position shown in Fig. 35, when the reversing-valve is shifted a quarter-turn, more or less, this turning of the valve will close the connection through the three-way passage 621 thereof between the inlet-port 611 and the chest-channel 613 and open connection through said three-way passage between said inlet-port and the chest-channel 614, and it will also close the connection through the two-way passage 622 of said valve between the chest-channel 614 and the exhaust-port 619 and open communication through said two-way passage between the chest-channel 613 and said exhaust-port. These connections in the reversed position of the reversing-valve are shown in Figs. 43, 44, and 45. The motive fluid entering through the inlet-port 611 will then pass through the chest-channel 614, thence by the elongated mouth 636 through the port 635 of the slide-valve, thence through the cylinder-channel 617 to the head end of the cylinder, reversing the movement of the piston. The exhaust from the crank end of the cylinder will then pass out through the cylinder-channel 616, thence through the slide-valve port 631, thence through the chest-channel 613, thence through the two-way passage 622 of the reversing-valve 620 to the exhaust-port 619. When the slide-valve is reversed by its eccentric, the supply of motive fluid entering through the inlet-valve 611 will pass through the three-way passage 621 of the reversing-valve 620, thence through the chest-channel 614, thence through the elongated mouth 636 and the port 635 of the slide-valve, thence around through the circuitous channel 637 therein, thence through the cylinder-channel 616 to the crank end of the cylinder. The piston then moves in the direction opposite to the arrow in Fig. 36, and the cylinder exhausts from the head end through the cylinder-channel 617, thence through the slide-valve channel 633, thence through the port 631 and its elongated mouth 632 of said slide-valve, thence through the chest-channel 613, thence through the two-way passage 622 of the reversing-valve 620 to the exhaust-port 619. This reversing mechanism enables the engine or motor to be reversed at any point of the piston-stroke.

The motive fluid is supplied, when compressed air is used, through a flexible pipe 670, connected at one end with the air-main within the mine and at the other end with the pipe 650, which discharges into the branch pipe 640, leading to the two cylinders of the duplex motor. The pipe 650 is provided with a stop-cock 660. The spindle of this stop-cock is provided with an operating-lever 661, which engages a lever-lock 662, provided with a series of notches adapted to hold the lever in adjusted position. The pressure of the fluid is controlled by the adjustment of this lever. One notch of the lever-lock holds the lever in position for a full pressure or supply of the motive fluid, another notch in position to cut off the flow entirely, and the intermediate notches afford positions for various pressures, as desired.

In the use of this machine the traction mechanism is first brought into operation to cause the car to travel through the mine and into the mine-room, where the coal to be taken up has been shot down. The lever 661 is actuated to open the cock admitting the motive fluid to the engine, and the lever 575 (shown in Fig. 28) is moved toward the left, whereby the traction mechanism is clutched with the driving-shaft, the driving mechanism for the traveling carriage on the car and the driving mechanism for the traveling shovel on the runway being at this time disconnected or unclutched from the main driving-shaft and the runway being tilted into the position shown in dotted lines in Fig. 11. When the car reaches a position on the mine-track in front of the coal to be loaded, the traction mechanism is disengaged and the car is locked or braked in stationary position on the track. Then the latch 472 is disengaged from the notch 505 and the operator grasps the handle 506 and swings the runway into operative position and locks it there by said latch, which engages one of the notches 501 to 504, according to the adjustment required. Before starting the loading mechanism the carriage on which it is mounted is usually adjusted at the rear of the car, as shown in Fig. 6. Then the driving mechanism for the traveling shovel is thrown into connection with the driving-shaft by adjustment of the lever 390, the lever 511, which controls the motor, being in position for the forward movement thereof. Assuming the shovel to be in the position shown in Fig. 1, it passes forward on the horizontal portion of the runway, thence downward through the inclined curved portion to the front thereof, and at its lower front edge engages the coal underneath the front end of the runway and moves forward beyond the front end thereof into the mass of coal, scooping up a load thereof, as indicated by dotted lines in Fig. 1. When the shovel reaches the end of its forward movement, its contact with the mechanism for controlling the engine reverses the latter, whereby the movement of the shovel is reversed. The shovel then passes backward and upward over the inclined portion of the runway, its rear supports engaging the lower track and its front supports the upper track thereon, whereby it is held in position to prevent spilling of its load. In the backward movement of the shovel at the front of the runway any excess of load is knocked off by coming in contact with the striker 560, and in passing through the horizontal rear portion of the runway the material thereon comes in contact with the scraper 550, and the latter swings upward freely, permitting the shovel, with its load, to pass under it. When the shovel reaches the rear end of its backward movement, it again actuates the valve-controlling mechanism, as hereinbefore described, and causes the engine to resume its forward movement. The movement of the shovel is thereby reversed automatically, and as it moves forward its load again engages the scraper 550 from the rear side thereof, and the latter remains stationary and operates to scrape out the load of coal from the shovel as it moves past the scraper. The coal pushed out of the shovel by the scraper 550 falls into the coal-car underneath the rear of the runway, as indicated in dotted lines in Fig. 1. During each successive forward movement of the shovel the operator will throw into gear with the driving-shaft the mechanism for moving the carriage, whereby the latter will be moved forward a short distance on the car, so as to carry the runway forward nearer the pile of coal and enable the shovel to take up its load therefrom. The traveling shovel may reciprocate on the runway, continuously picking up and discharging the coal. When the coal has been taken out in front of the mine-track, the operator causes the carriage to run back on the car and turns the swiveling base to the right or left as the shovel moves forward, whereby it is enabled to take up its coal at one side of the center track. During the backward movement of the shovel the operator will turn the base to bring the runway into line with the track, so as to deliver the coal into the mine-car. As a car is filled it is drawn out and another brought into its place. The swiveling base may of course be operated to take coal at the sides before advancing the carriage, if found more effective.

I claim as my invention—

1. The combination of a traveling runway, a traveling shovel movable over said runway, and having a forward thrust beyond it, means for reciprocating said shovel on said runway and thrusting its front end beyond said runway into a mass of material to be moved, and means for engaging the material in said shovel for discharging it.

2. The combination of a traveling runway, a traveling shovel movable over said runway, and having a forward thrust beyond it, means for reciprocating said shovel on said runway and thrusting its front end beyond said runway into a mass of material to be moved, and automatic means for reversing the travel of the shovel at the opposite ends of its movement.

3. The combination of a traveling runway, a traveling shovel movable over said runway, means for reciprocating said shovel on said runway and thrusting it into a mass of material to be moved, means for engaging the material in said shovel for discharging it, and automatic means for reversing the travel of the shovel at the opposite ends of its movement.

4. The combination of a traveling runway, a traveling shovel movable over said runway, means for reciprocating said shovel on said runway and thrusting it into a mass of material to be moved, means for elevating the front end of the shovel on the backward movement, and automatic means for reversing the shovel at opposite ends of its movement.

5. The combination of a traveling runway, a traveling shovel movable over said runway, means for reciprocating said shovel on said runway and thrusting it into a mass of material to be moved, means for elevating the front end of the shovel on the backward movement, and means for engaging the material in said shovel for discharging it.

6. The combination of a traveling runway, a traveling shovel movable on said runway, and having a forward thrust beyond it, means for reciprocating said shovel on said runway and thrusting its front end beyond said runway into a mass of material to be moved, and a scraper disposed at the delivery portion of said runway for discharging the material from the shovel.

7. The combination of a traveling runway, a traveling shovel movable on said runway, means for reciprocating said shovel on said runway and thrusting it into a mass of material to be moved, and a pivoted scraper disposed at the delivery portion of said runway and adapted to swing in one direction to permit the passage of the loaded shovel behind it and provided with a stop to hold it in fixed position in front of the load for discharging the latter on the next forward movement of the shovel.

8. The combination of a traveling runway, a traveling shovel movable on said runway, means for reciprocating said shovel on said runway and thrusting it into a mass of material to be moved, and a pivoted scraper disposed at the delivery portion of said runway and composed of a plurality of independently-movable fingers.

9. The combination of a car, a carriage movable thereon, an inclined runway mounted on said carriage, a traveling shovel movable over said runway, and having a forward thrust beyond it, means for reciprocating said shovel on said runway and thrusting its front end beyond said runway into a mass of material to be moved, and means for moving said carriage on said car to change the position of thrust of said shovel.

10. The combination of a car, a carriage movable thereon, an inclined runway mounted on said carriage, a traveling shovel movable over said runway, means for reciprocating said shovel on said runway and thrusting it into a mass of material to be moved, means for moving said carriage on said car to change the position of thrust of said shovel, and means for locking the carriage in any desired position on the car.

11. The combination of a car, a carriage movable thereon, an inclined runway mounted on said carriage, a traveling shovel movable over said runway, means for reciprocating said shovel on said runway and thrusting it into a mass of material to be moved, and means for moving said carriage lengthwise of said car to change the position of thrust of said shovel.

12. The combination of a car, a traveling carriage mounted on said car and comprising a platform and a swiveling base, an inclined runway mounted on said swiveling base, a traveling shovel disposed on said runway, means for reciprocating said shovel on said runway and thrusting it into a mass of material to be moved, and means for oscillating said base.

13. The combination of a car, a traveling carriage mounted on said car and comprising a platform and a swiveling base, an inclined runway mounted on said swiveling base, a traveling shovel disposed on said runway, means for reciprocating said shovel on said runway and thrusting it into a mass of material to be moved, means for oscillating said base, and means for moving said carriage on said car to change the position of take-up of said shovel.

14. The combination of an inclined runway, a traveling shovel disposed thereon, means for reciprocating said shovel on said runway and thrusting it forward at the front thereof to take up material, a striker at the front of said runway for knocking off surplus material, and a discharging device at the rear of said runway.

15. The combination of a traveling runway comprising an inclined front portion and a horizontal rear portion, a traveling shovel movable over said inclined and horizontal portions, and means for reciprocating said shovel on said runway and thrusting it into a mass of material to be moved.

16. The combination of a traveling runway comprising an inclined front portion and a horizontal rear portion, a traveling shovel movable over said inclined and horizontal portions, means for reciprocating said shovel on said runway and thrusting it into a mass of material to be moved, and means for engaging the material in the shovel for discharging it.

17. The combination of a traveling runway comprising an inclined front portion and a horizontal rear portion, a traveling shovel movable on said runway, means for reciprocating said shovel on said runway for taking up material, and a scraper disposed at the rear portion of said runway for discharging the material from the shovel.

18. The combination of a traveling runway comprising an inclined front portion and a horizontal rear portion, a traveling shovel movable over said inclined and horizontal portions and having a forward thrust beyond said runway, means for reciprocating said shovel on said runway for taking up material, and means for elevating the front end of the shovel on the backward movement thereof.

19. The combination of a traveling runway comprising an inclined front portion and a horizontal rear portion, a traveling shovel movable over said inclined and horizontal portions, means for reciprocating said shovel on said runway and thrusting it into a mass of material to be moved, means for elevating the front end of the shovel on the backward movement thereof and means for engaging the material in the shovel for discharging it.

20. The combination of a traveling runway comprising an inclined front portion and a horizontal rear portion, a traveling shovel movable over said inclined and horizontal portions, means for reciprocating said shovel on said runway and thrusting it into a mass of material to be moved, means for elevating the front end of the shovel on the backward movement thereof, and a scraper disposed at the delivery portion of said runway for discharging the material from the shovel.

21. The combination of a movable runway comprising an inclined front portion and an elevated rear portion, a traveling shovel disposed thereon, means for reciprocating said shovel on said runway and thrusting it into a mass of material to be taken up, and automatic means for reversing the shovel at the opposite ends of its movement.

22. The combination of a runway, a traveling shovel movable thereon and having a forward thrust beyond it, pulleys at opposite ends of said runway, a belt on said pulleys engaging the rear portion of said shovel between said pulleys, and means for driving said belt.

23. The combination of a runway, a traveling shovel movable over said runway and having a forward thrust beyond it, sprocket-wheels at opposite ends of said runway, a sprocket-chain passing over said sprocket-wheels and connecting with said shovel between said sprocket-wheels, driving means, and means for engaging the material in said shovel for discharging it.

24. The combination of a runway, a traveling shovel movable over said runway and having a forward thrust beyond it, sprocket-wheels at opposite ends of said runway, an endless sprocket-chain passing over said sprocket-wheels and pivotally connected to the rear portion of the body of said shovel between said pulleys, and driving means.

25. The combination of a traveling base, standards supported thereon, a tilting runway supported on said standards and provided with an arc-shaped side plate having a segmental rack, a pinion engaging said rack, means for actuating said pinion, and a traveling shovel movable over said runway and having a forward thrust beyond it.

26. The combination of a traveling base, standards supported thereon, a tilting runway supported on said standards and provided with an arc-shaped side plate having a segmental rack, a pinion engaging said rack, means for actuating said pinion, a locking device for holding said runway in adjusted position, a traveling shovel adapted to reciprocate on said runway and having a forward thrust beyond the front end thereof, and means for reciprocating said shovel on said runway.

27. The combination of a movable runway comprising main and branch tracks, a traveling shovel movable on said tracks, means for reciprocating said shovel on said runway and thrusting it into a mass of material to be taken up, and an automatic switch for switching the front portion of the shovel on the branch track on the backward movement.

28. The combination of a runway comprising an inclined portion provided with two tracks disposed one above the other, a traveling shovel provided with rear and forward supports, one set of said supports engaging one of the tracks on the backward and forward movements of the shovel and the other set engaging one of said tracks on the forward movement and the other track on the backward movement.

29. The combination of a runway comprising an inclined portion provided with two tracks disposed one above the other, a traveling shovel provided with rear and forward supports, one set of said supports engaging one of the tracks on the backward and forward movements of the shovel and the other set engaging one of said tracks on the forward movement and the other track on the backward movement, and automatic switches connecting said tracks.

30. The combination of a traveling runway comprising an inclined portion provided with two tracks disposed one above the other, a traveling shovel provided with rear and forward supports, one set of said supports engaging one of the tracks on the backward and forward movements of the shovel and the other set engaging one of said tracks on the forward movement and the other on the backward movement.

31. The combination of a traveling runway comprising an inclined portion provided with two tracks, disposed one above the other, a traveling shovel provided with rear and forward supports, one set of said supports engaging one of the tracks on the backward and forward movements of the shovel and the other set engaging one of said tracks on the forward movement and the other on the backward movement, and automatic switches connecting said tracks.

32. The combination of a traveling runway comprising an inclined portion provided with main and branch tracks, the branch track being disposed above the main track, a traveling shovel provided with rear and forward supports, the rear supports traveling on the main track in both the forward and backward movements of the shovel and the forward supports traveling on the main track on the forward movement and on the branch track on the backward movement to elevate the front of the shovel and avoid loss of coal.

33. The combination of a traveling and swiveling runway comprising an inclined portion having main and branch tracks, the branch track being disposed above the main track, automatic switches connecting the branch track with the main track, the rear switch being normally open for the main track and the front switch being normally open for the branch track, a traveling shovel provided with rear and forward supports engaging said tracks, the forward supports riding up the branch track on the backward movement for leveling the shovel, and means for reciprocating said shovel on said tracks.

34. The combination of a car, a traveling carriage mounted on said car, a runway mounted on said carriage and comprising an inclined portion having main and branch tracks, the branch track being disposed above the main track, automatic switches connecting the branch track with the main track, the rear switch being normally open for the main track and the front switch being normally open for the branch track, a traveling shovel provided with rear and forward supports engaging said tracks, the forward supports riding up the branch track on the backward movement for leveling the shovel, and means for reciprocating said shovel on said tracks.

35. The combination of a car, a traveling carriage thereon, a runway mounted on said carriage and provided with two tracks disposed one above the other, a traveling shovel provided with rear and forward supports, one set of said supports engaging one of the tracks on the backward and forward movement of the shovel and the other set engaging one of said tracks on the forward movement and the other on the backward movement.

36. The combination of a car, a runway supported on said car comprising an inclined portion having main and branch tracks, the branch track being disposed above the main track, automatic switches connecting the branch track with the main track, the rear switch being normally open for the main track and the front switch being normally open for the branch track, a traveling shovel provided with rear and forward supports engaging said tracks, the forward supports riding up the branch track on the backward movement for leveling the shovel, and means for reciprocating said shovel on said tracks.

37. The combination of a traveling runway comprising an inclined portion having main and branch tracks, the branch track being connected with the main track by automatic switches, a traveling shovel provided with rear and forward supports engaging said tracks and operating said switches, and means for reciprocating said traveling shovel on said runway.

38. The combination of a traveling runway comprising an inclined portion having main and branch tracks, the branch track being connected with the main track by automatic switches, a traveling shovel provided with rear and forward supports engaging said tracks and operating said switches, means for reciprocating said traveling shovel on said runway, and automatic means for reversing the movement of the shovel.

39. The combination of a traveling runway, a traveling shovel thereon provided with rear and forward trunnions engaging said runway, sprocket-wheels mounted on said runway, endless sprocket-chains movable over said wheels and having links pivoted to the rear trunnions of said traveling shovel and driving mechanism for said chains.

40. The combination of a car, a traveling carriage thereon comprising a platform provided with a peripheral rack and a swiveling base provided with a pinion engaging said rack, a runway mounted on said carriage, a traveling shovel on said runway, and means for moving said shovel on said runway.

41. The combination of a car, a carriage movable thereon, a runway mounted on said carriage and comprising an inclined downwardly-curved front portion and an elevated horizontal rear portion adapted to extend over a point of discharge, a traveling shovel movable throughout said runway and adapted to project beyond the front thereof for scooping up material, means for reciprocating said shovel on said runway, and means for moving said carriage on said car to advance the thrust of the shovel.

42. The combination of a car, a carriage movable thereon, a traveling runway mounted on said carriage and comprising an inclined downwardly-curved front portion and an elevated horizontal rear portion adapted to extend over a point of discharge, a traveling shovel movable throughout said runway and adapted to project beyond the front thereof for scooping up material, and means for reciprocating said shovel on said runway.

43. The combination of a car, a traveling platform thereon, a swiveling base on the platform, a runway mounted on the swiveling base, a traveling shovel on the runway, a motor mounted on the swiveling base, a driving-shaft operated by the motor, mechanism for moving the platform on the car, mechanism for reciprocating the traveling shovel on the runway, and clutches connecting said mechanisms with the driving-shaft.

44. The combination of a car, a traveling platform thereon, a swiveling base on the platform, a runway mounted on the swiveling base, a traveling shovel on the runway, a motor mounted on the swiveling base, a driving-shaft operated by the motor, mechanism for moving the platform on the car, mechanism for reciprocating the traveling shovel on the runway, clutches connecting said mechanisms with the driving-shaft, and means for turning said base.

45. The combination of a traveling runway comprising an inclined front portion and an elevated horizontal rear portion adapted to extend over a point of discharge, a traveling shovel movable over said runway, means for reciprocating said shovel on said runway and thrusting it into a mass of material to be moved, and a chute disposed under the front part of the horizontal portion of said runway and under the rear part of the inclined portion thereof.

ANDREW JACKSON DOSS.

Witnesses:
PERCY MORRIS BURRILL,
J. H. RILEY.